United States Patent
Wang Lee

(10) Patent No.: US 9,864,210 B2
(45) Date of Patent: Jan. 9, 2018

(54) ELASTIC EYEGLASS TEMPLE

(71) Applicant: Jiann Lih Optical Co., Ltd., Tainan (TW)

(72) Inventor: Chen Chang Wang Lee, Tainan (TW)

(73) Assignee: Jiann Lih Optical Co., Ltd., Tainan (TW)

( * ) Notice: Subject to any disclaimer, the term of this patent is extended or adjusted under 35 U.S.C. 154(b) by 0 days.

(21) Appl. No.: 14/970,813

(22) Filed: Dec. 16, 2015

(65) Prior Publication Data

US 2017/0176770 A1    Jun. 22, 2017

(51) Int. Cl.
*G02C 5/16* (2006.01)
*G02C 5/00* (2006.01)
*G02C 5/14* (2006.01)

(52) U.S. Cl.
CPC ............. *G02C 5/16* (2013.01); *G02C 5/008* (2013.01); *G02C 5/143* (2013.01); *G02C 2200/16* (2013.01)

(58) Field of Classification Search
CPC .......... G02C 5/16; G02C 5/008; G02C 5/143; G02C 2200/16
USPC ........................................................ 351/114
See application file for complete search history.

(56) References Cited

U.S. PATENT DOCUMENTS

| | | | | |
|---|---|---|---|---|
| 6,050,685 A * | 4/2000 | Lin | ......................... | G02C 1/02 351/110 |
| 8,042,937 B2 * | 10/2011 | Iimura | ..................... | G02C 5/16 351/111 |
| 2011/0019145 A1 * | 1/2011 | Sheldon | ................. | G02C 11/00 351/44 |
| 2011/0181829 A1 * | 7/2011 | Horikawa | .............. | G02C 5/146 351/113 |
| 2013/0271721 A1 * | 10/2013 | Chen | ....................... | G02C 1/08 351/121 |
| 2014/0092358 A1 * | 4/2014 | Chen | ....................... | G02C 5/16 351/113 |

* cited by examiner

*Primary Examiner* — Ricky Mack
*Assistant Examiner* — Daniele Manikeu
(74) *Attorney, Agent, or Firm* — Alan D. Kamrath; Kamrath IP Lawfirm, P.A.

(57) ABSTRACT

An elastic eyeglass temple includes: a main body; one or more holes which are formed in one predetermined section or respectively in plural predetermined sections of the main body and which, if plural, can be spaced apart or in communication with one another; and one or more flexible members which correspond in configuration to the hole or respectively to the plural holes, which are fitted in the hole or respectively in the plural holes, and which lie compliantly along the main body, such that the one or more flexible members form a single unit with the main body. Once pivotally connected to the corresponding lateral end of an eyeglass frame, the eyeglass temple can stay elastic and provide an elastic contact with a lateral side of the user's head even after it has been pulled outward repeatedly for some time.

11 Claims, 5 Drawing Sheets

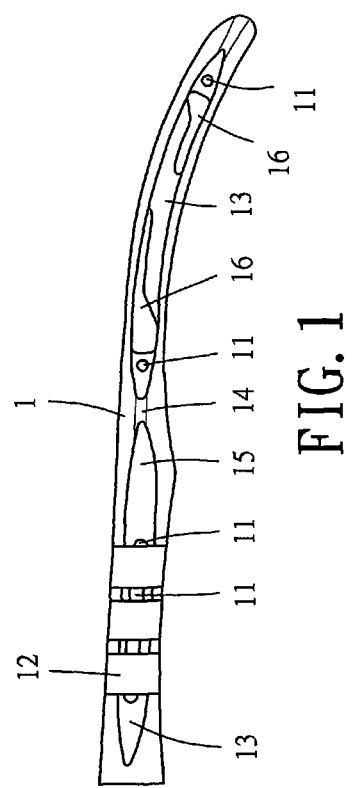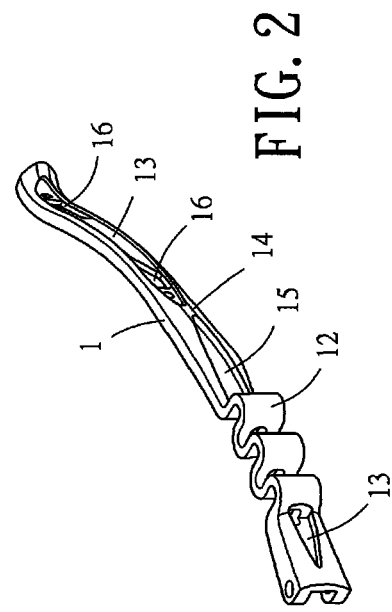

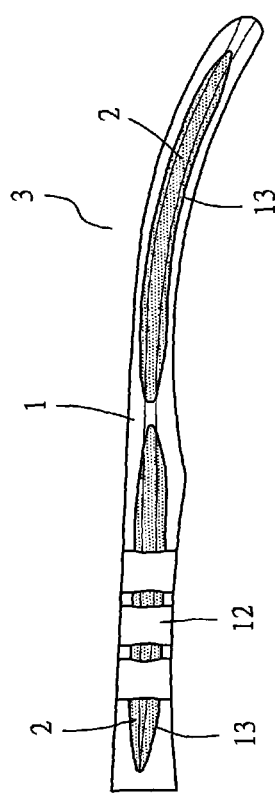
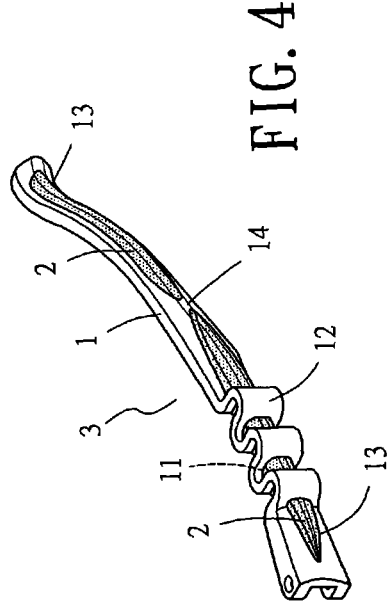
FIG. 3
FIG. 4

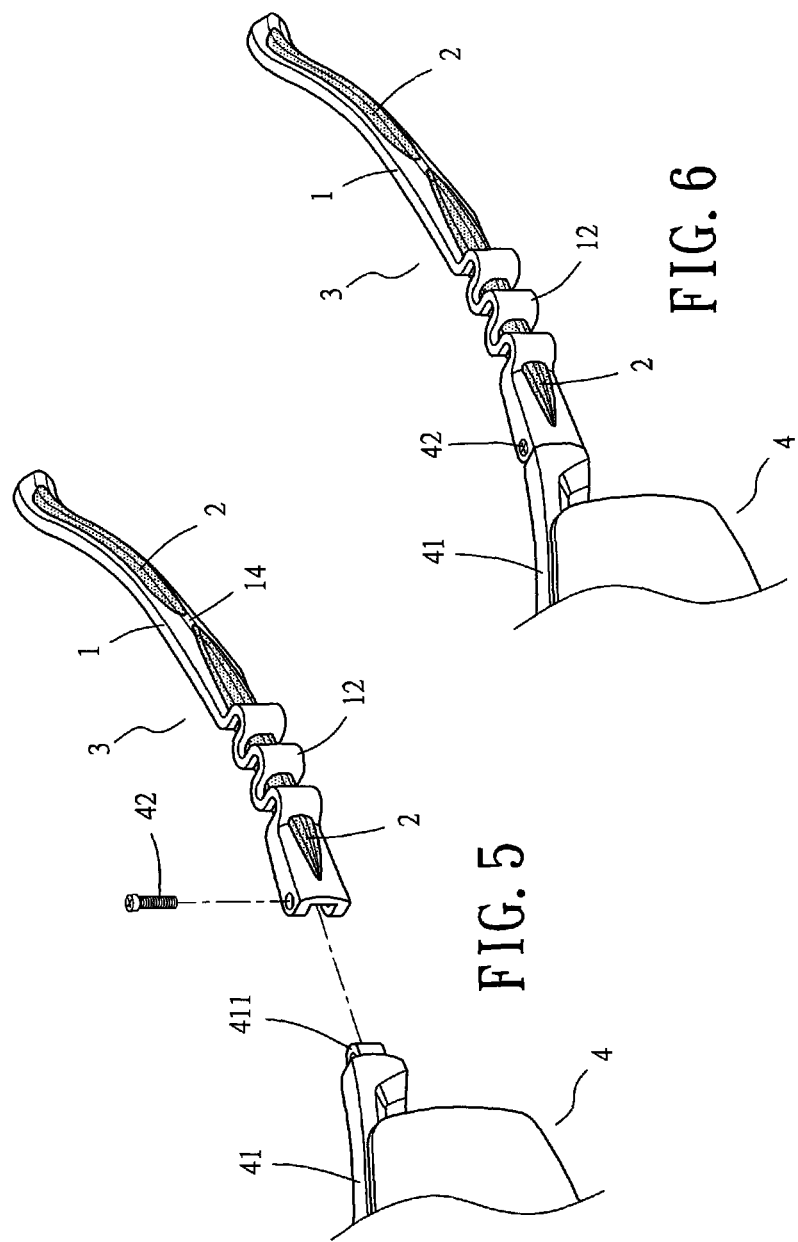

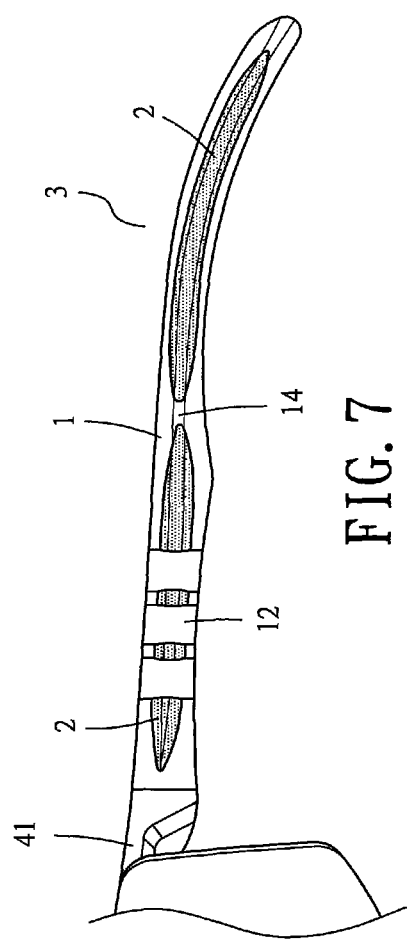

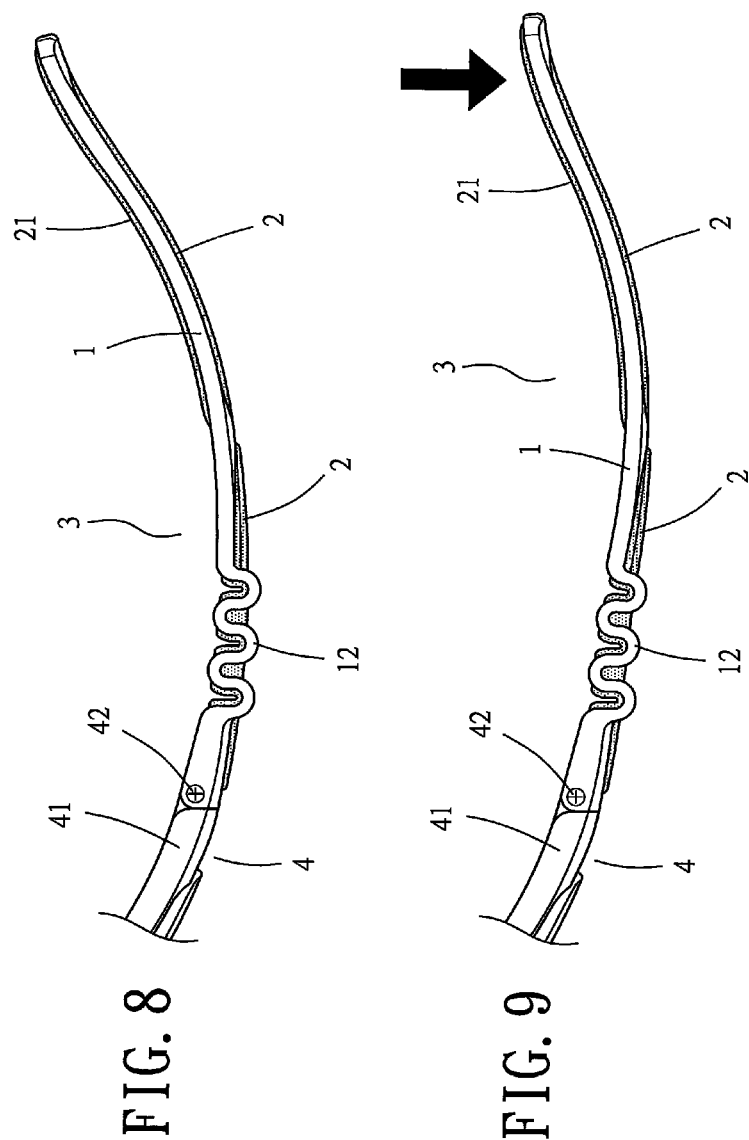

ELASTIC EYEGLASS TEMPLE

BACKGROUND OF THE INVENTION

1. Technical Field

The present invention relates to eyeglass temples. More particularly, the present invention relates to an elastic eyeglass temple to be provided at one of two lateral ends of an eyeglass frame. The eyeglass temple has a main body made of a relatively hard material and a flexible member made of a relatively soft material and fitted in the main body to form a single unit therewith, so that the eyeglass temple can be pulled outward repeatedly after being assembled to the eyeglass frame and can stay elastic and provide a proper elastic contact with one side of the user's head even after use for a while.

2. Description of Related Art

Eyeglasses for optical purposes (e.g., for correcting myopia, hyperopia, astigmatism, or other visual defects) or for sport-related uses typically include a frame of a predetermined configuration, functional lenses set in the frame, and temples pivotally and respectively connected to the two lateral ends of the frame. Such eyeglasses are indeed capable of vision correction or eye protection. Some eyeglasses are so designed that their temples are elastically and respectively pressed against the lateral sides of the wearer's head and can adapt to the width of the wearer's head or face. These elastically adjustable eyeglass temples are diverse in configuration.

BRIEF SUMMARY OF THE INVENTION

The present invention provides a novel design for eyeglass temples to be pivotally and respectively connected to the two lateral ends of an eyeglass frame. The eyeglass temple disclosed herein uses only simple components to achieve the desired elasticity.

The primary objective of the present invention is to provide an elastic eyeglass temple to be pivotally connected to the corresponding one of two lateral ends of an eyeglass frame. The eyeglass temple includes: a main body; a hole or a plurality of holes formed in a predetermined section or respectively in a plurality of predetermined sections of the main body, with the plurality of holes, if so provided, spaced apart or in communication with one another; and a flexible member or a plurality of flexible members corresponding in configuration to the hole or respectively to the plurality of holes. Each flexible member is precisely fit in one hole and lies compliantly along the main body to form a single unit with the main body. Once pivotally connected to the corresponding lateral end of the eyeglass frame, the eyeglass temple can remain elastic and provide an elastic contact with a lateral side of the user's head even after being pulled outward repeatedly for some time.

The second objective of the present invention is to provide the foregoing elastic eyeglass temple with the main body of the eyeglass frame having a predetermined section formed as a curvy section. The curvy section includes a bend or a plurality of continuous or non-continuous bends, so that the eyeglass temple can be pulled outward elastically with ease and return elastically to its initial position with ease during use.

The third objective of the present invention is to provide the foregoing elastic eyeglass temple with the hole or the plurality of holes formed in the predetermined section or respectively in the plurality of predetermined sections of the main body of the eyeglass temple having an abutting portion at each of the front end and the rear end of the main body to limit the flexible member or the plurality of flexible members in position after the flexible member or the plurality of flexible members are fitted into the hole or respectively into the plurality of holes of the main body.

The fourth objective of the present invention is to provide the foregoing elastic eyeglass temple with the hole or the plurality of holes formed in the predetermined section or respectively in the plurality of predetermined sections of the main body of the eyeglass temple having an outer position-limiting portion or a plurality of outer position-limiting portions to keep the elastic member or the plurality of elastic members in place with respect to the main body while the main body is being pulled outward or returning to its initial position.

The fifth objective of the present invention is to provide the foregoing elastic eyeglass temple with the elastic member or the plurality of elastic members of the eyeglass temple having a contact layer provided near the rear end and protruding slightly from the inner side of the main body in order for the eyeglass temple to be pressed gently against the lateral side of the user's head.

The sixth objective of the present invention is to provide the foregoing elastic eyeglass temple with the main body of the eyeglass temple made of a relatively hard material, while the flexible member or the plurality of flexible members fitted in the hole or respectively in the plurality of holes of the main body are made of a relatively soft material, in order for the eyeglass temple to have proper stiffness and proper elasticity.

The seventh objective of the present invention is to provide the foregoing elastic eyeglass temple with the hole or the plurality of holes formed in the predetermined section or respectively in the plurality of predetermined sections of the main body of the eyeglass temple including a recessed region in the outer side of the main body and/or a hollow region penetrating, and open on both the outer side and the inner side of, the main body, so that the flexible member or the plurality of flexible members fitted in the hole or respectively in the plurality of holes of the main body are visible on the outer side of the main body or on both the outer side and the inner side of the main body.

BRIEF DESCRIPTION OF THE SEVERAL VIEWS OF THE DRAWINGS

FIG. 1 is a side view of the main body of the eyeglass temple in an embodiment of the present invention, showing the outer side of the main body;

FIG. 2 is a perspective view of the main body of the eyeglass temple in FIG. 1, showing the outer side of the main body;

FIG. 3 is another side view of the main body of the eyeglass temple in FIG. 1, showing the inner side of the main body and how the elastic members are fitted into the main body;

FIG. 4 is another perspective view of the main body of the eyeglass temple in FIG. 1, showing the outer side of the main body and how the elastic members are fitted into the main body;

FIG. 5 is a perspective view showing the eyeglass temple in FIG. 1 and a matching eyeglass frame before they are put together;

FIG. 6 is a perspective view of the eyeglass temple and the eyeglass frame in FIG. 5 after assembly;

FIG. 7 is a side view of the eyeglass temple and the eyeglass frame in FIG. 5 after assembly, showing the outer side the eyeglass temple;

FIG. 8 is a top view of the eyeglass temple and the eyeglass frame in FIG. 5 after assembly; and FIG. 9 is a top view showing the eyeglass temple in FIG. 6 being pulled outward.

DETAILED DESCRIPTION OF THE INVENTION

The present invention provides an elastic eyeglass temple. Referring to FIG. 1, FIG. 2, and FIG. 5, an eyeglass temple 3 is configured for pivotal connection with the corresponding one of the two lateral ends of the frame 41 of a pair of eyeglasses 4 and includes a main body 1. The main body 1 is formed with one or more holes 11 located in a predetermined section or respectively in plural predetermined sections of the main body 1. If plural holes 11 are provided, they can be spaced apart or in communication with one another. In this embodiment, the plural holes 11 include plural abutting portions 13 and plural hollow regions 16, as detailed further below. Flexible members 2 whose configurations correspond respectively to those of the holes 11 are fitted precisely and respectively into the holes 11 and lie compliantly along the main body 1, as shown in FIG. 3. The flexible members 2 and the main body 1 thus form a single unit, as shown in FIG. 4. In addition, a predetermined section of the main body 1 of the eyeglass temple 3 is formed as a curvy section 12 which includes a bend or a plurality of continuous or non-continuous bends. The curvy section 12 allows the eyeglass temple 3 to be pulled outward elastically and return elastically to its initial position with greater ease than without the curvy section 12. The one or plural holes 11 in the predetermined section/sections of the main body 1 must have an abutting portion 13 at each of the front and rear ends of the main body 1 in order to limit the position(s) of the one or plural flexible members 2 fitted in the one or plural holes 11. Also, the one or plural holes 11 in the predetermined section/sections of the main body 1 must have one or plural outer position-limiting portions 14 to ensure that the one or plural flexible members 2 will stay in place with respect to the main body 1 while the main body 1 is being pulled outward or returning to its original position. Moreover, the one or plural holes 11 in the predetermined section/sections of the main body 1 may include a recessed region 15 in the outer side of the main body 1 and/or a hollow region 16 which penetrates, and is open on both the inner and outer sides of, the main body 1, thus allowing the one or plural flexible members 2 to be seen on only the outer side of the main body 1 or on both the inner and outer sides of the main body 1, as shown in FIG. 8.

With continued reference to FIG. 8, the one or plural flexible members 2 fitted in the main body 1 of the eyeglass temple 3 must have a contact layer 21 which is located near the rear end, and protrudes slightly from the inner side, of the main body 1 so that the eyeglass temple 3 is pressed gently against a lateral side of the wearer's head during use. In order for the eyeglass temple 3 to have adequate stiffness and elasticity, the main body 1 of the eyeglass temple 3 is made of a relatively hard material while the flexible member 2 fitted in each hole 11 is made of a relatively soft material.

To pivotally connect the eyeglass temple 3 to the frame 41 of the eyeglasses 4 (or more particularly to the connecting portion at the corresponding lateral end of the frame 41), referring to FIG. 5, the pre-formed upper and lower apertures at the front end of the eyeglass temple 3 are aligned with the bored lug 411 on the corresponding lateral end of the frame 41, and a threaded fastener 42 is inserted sequentially through the upper (or lower) aperture of the eyeglass temple 3, the bored lug 411 of the frame 41, and the lower (or upper) aperture of the eyeglass temple 3 to form a pivotal connection between the eyeglass temple and the frame, as shown in FIG. 6 and FIG. 7.

Once a pair of the foregoing eyeglass temples 3 are pivotally and respectively connected to the two lateral ends of the frame 41 to complete the eyeglasses 4, a user can put on the eyeglasses 4 by pulling the eyeglass temples 3 outward, as shown in FIG. 8 and FIG. 9, during which process the main bodies 1 and the one or plural flexible members 2 fitted in each main body 1 provide the toughness and resilience required for pulling the eyeglass temples 3 outward elastically. After that, the eyeglass temples 3 are allowed to return to their original positions and thereby come into gentle contact with the two lateral sides of the user's head respectively. Even after the eyeglass temples 3 have been pulled outward repeatedly for some time, they remain elastic and can provide an elastic contact with the wearer's head.

What is claimed is:

1. An elastic eyeglass temple, to be pivotally connected to a corresponding one of two lateral ends of an eyeglass frame, comprising:
    a main body having an outer side and an inner side opposite to the outer side with the inner side configured to press against a lateral side of a user's head, wherein the main body is made of a relatively hard material;
    a hole extending from the inner side towards the outer side and formed in a predetermined section of the main body; and
    a flexible member corresponding in configuration to the hole, with the flexible member fit in the hole and lying compliantly on the inner side of the main body to form a single unit with the main body, with the flexible member made of a relatively soft material softer than the relatively hard material in order for the eyeglass temple to have proper stiffness and proper elasticity, wherein the main body pivotally connected to the corresponding one of the two lateral ends of the eyeglass frame is able to remain elastic and provide an elastic contact with the lateral side of a user's head even after being pulled outward repeatedly for some time.

2. The elastic eyeglass temple of claim 1, wherein the hole in the predetermined section comprises a plurality of holes formed respectively in a plurality of predetermined sections of the main body, wherein the plurality of holes is spaced apart or in communication with one another; and wherein the flexible member comprises a plurality of flexible members corresponding in configuration respectively to the plurality of holes.

3. The elastic eyeglass temple of claim 2, wherein each predetermined section is formed as a curvy section, and wherein the curvy section comprises a bend or a plurality of continuous or non-continuous bends able to be pulled outward elastically and return elastically to an initial position thereof during use.

4. The elastic eyeglass temple of claim 2, wherein each hole has an abutting portion formed in the inner surface at each of a front end and a rear end of the main body to limit each flexible member in position after each flexible member is fit into the hole.

5. The elastic eyeglass temple of claim 2, wherein each hole has an outer position-limiting portion or a plurality of outer position-limiting portions to keep each flexible member in place with respect to the main body while the main body is being pulled outward or returning to an initial position thereof.

6. The elastic eyeglass temple of claim 2, wherein each flexible member has a contact layer provided near a rear end and protruding slightly from an inner side of the main body in order for the eyeglass temple to be pressed gently against the lateral side of the user's head.

7. The elastic eyeglass temple of claim 2, wherein each hole comprises a recessed region in the main body and/or a hollow region extending through and open on both the outer side and the inner side of the main body with each flexible member fit in the hole visible on the main body or on both the outer side and the inner side of the main body.

8. The elastic eyeglass temple of claim 1, wherein each hole has an abutting portion formed in the inner surface at each of a front end and a rear end of the main body to limit each flexible member in position after each flexible member is fit into the hole.

9. The elastic eyeglass temple of claim 1, wherein each hole has an outer position-limiting portion or a plurality of outer position-limiting portions to keep each flexible member in place with respect to the main body while the main body is being pulled outward or returning to an initial position thereof.

10. The elastic eyeglass temple of claim 1, wherein each flexible member has a contact layer provided near a rear end and protruding slightly from an inner side of the main body in order for the eyeglass temple to be pressed gently against the lateral side of the user's head.

11. The elastic eyeglass temple of claim 1, wherein each hole comprises a recessed region in the main body and/or a hollow region extending through and open on both the outer side and the inner side of the main body with each flexible member fit in the hole visible on the main body or on both the outer side and the inner side of the main body.

* * * * *